(12) United States Patent
Yada

(10) Patent No.: US 8,708,068 B2
(45) Date of Patent: Apr. 29, 2014

(54) FRICTIONAL DRIVE DEVICE AND TRACTION WHEEL

(71) Applicant: Honda Motor Co., Ltd., Tokyo (JP)

(72) Inventor: Wataru Yada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/674,278

(22) Filed: Nov. 12, 2012

(65) Prior Publication Data

US 2013/0133960 A1 May 30, 2013

(30) Foreign Application Priority Data

Nov. 24, 2011 (JP) ................................. 2011-255889

(51) Int. Cl.
*B62K 1/00* (2006.01)
*B60B 19/00* (2006.01)

(52) U.S. Cl.
CPC *B60B 19/003* (2013.01); *B62K 1/00* (2013.01)
USPC .............................. 180/7.1; 301/5.23; 305/52

(58) Field of Classification Search
CPC ........ B60B 19/003; B62K 1/00; B62K 3/007; B62K 15/00; B60Y 2200/40; B60L 2200/14; A63B 2022/0271
USPC ......................... 180/21, 7.1; 301/5.23; 305/52
See application file for complete search history.

(56) References Cited

U.S. PATENT DOCUMENTS

| | | | | |
|---|---|---|---|---|
| 3,465,843 A | * | 9/1969 | Guinot | 180/447 |
| 3,746,117 A | * | 7/1973 | Alred | 180/21 |
| 3,968,995 A | * | 7/1976 | Arentzen | 299/76 |
| 2010/0096905 A1 | | 4/2010 | Takenaka et al. | |
| 2011/0068738 A1 | * | 3/2011 | Gomi et al. | 320/108 |
| 2011/0070997 A1 | * | 3/2011 | Gomi et al. | 476/66 |
| 2012/0032496 A1 | | 2/2012 | Takenaka et al. | |

FOREIGN PATENT DOCUMENTS

| | | | | |
|---|---|---|---|---|
| JP | 2003127605 A | * | 5/2003 | ............. B60B 19/00 |
| JP | 3820239 B2 | | 9/2006 | |
| JP | 2010-247640 A | | 11/2010 | |
| JP | 2011-063209 A | | 3/2011 | |
| WO | 2008/132779 A1 | | 11/2008 | |

* cited by examiner

*Primary Examiner* — Keith Frisby
(74) *Attorney, Agent, or Firm* — Carrier Blackman & Associates, P.C.; Joseph P. Carrier; Michael J. McCandlish

(57) ABSTRACT

A friction drive device comprises a pair of drive disks rotatably supported by a frame opposite to each other in a coaxial relationship, a power source for individually rotatively actuating the drive disks, a traction wheel interposed between the drive disks and including a plurality of articulation members pivotally connected in tandem into a loop and a free roller rotatably support by each articulation member so as to be rotatable around an axial line extending along the loop, and drive rollers pivotally supported along a peripheral part of each drive disk at a regular angular interval and engaging the free rollers at an oblique angle. The articulation members allow the free rollers to be held in a loop without requiring a stiff annular member.

13 Claims, 9 Drawing Sheets

FRICTIONAL DRIVE DEVICE AND TRACTION WHEEL

TECHNICAL FIELD

The present invention relates to a frictional drive device and an omni-directional vehicle using the same as a drive unit, and in particular to a traction wheel that is suited to be used in the friction drive device.

BACKGROUND OF THE INVENTION

There is a demand for vehicles that can travel both in the fore and aft direction and in the lateral direction. Such vehicles may be useful for vehicles and robots that are required to be highly maneuverable in a limited space. The main wheel for omni-directional vehicles normally consists of an omni-wheel that can travel both longitudinally and laterally. The main wheel disclosed in WO2008132779A1 (US2010096905A1) comprises a stiff annular member and a plurality of free rollers rotatably fitted on the annular member via a sleeve member like so many beads of a rosary. Each sleeve member is required to have an arcuate bore configured to be fitted on the annular member and a truly cylindrical outer surface so that the free roller may be able to rotate substantially without any friction or play. JP 3820239B discloses different examples of omni-wheels.

Such an omni-wheel, in particular the one disclosed in WO2008132779A1 (US2010096905A1), can be favorably used for a friction drive device and an omni-directional vehicle incorporated with such a friction drive device. In the omni-directional vehicle disclosed in this prior patent publication comprises a pair of drive assemblies individually actuated by electric motors and a main wheel held between the drive assemblies and frictionally driven by the drive assemblies. See for instance. Each drive assembly comprises a drive disk coaxially opposing the drive disk of the other drive assembly and rotatably supported by a frame, and a plurality of drive rollers obliquely arranged along the circumference of the drive disk at a regular interval so as to be individually rotatable. The main wheel comprises a ring-shaped annular member rotatably supporting a plurality of driven rollers (free rollers) arranged along the circumferential length of the annular member so as to be rotatable around the respective tangential lines of the annular member. The driven rollers are interposed between the two groups of the drive rollers rotatably supported by the two respective drive disks. As the drive disks are turned by the electric motors, the driven rollers are frictionally driven by the drive rollers. When the driven rollers are turned around the tangential directions of the annular member (or around the respective center lines of the driven rollers) by the drive rollers, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

According to this previous proposal, it was found that considerable efforts and costs are required to construct the main wheel (traction wheel) of this kind. In particular, each sleeve member must be secured to the annular member while providing a truly cylindrical outer surface. Also, the annular member requires a relatively high cost for fabrication.

Furthermore, the conventional arrangement may not be able to provide an optimum performance. If the annular member is highly stiff, only the lowermost free roller engages the road surface so that the maximum lateral traction is limited. If the annular member is elastic, it is possible to cause two or more of the free rollers to engage the road surface at the same time. However, if the annular member is not stiff enough, the adjoining free rollers may be axially aligned with each other (in parallel with the road surface), and this prevents a favorable engagement between the drive rollers and the free rollers. Also, if the stiffness of the annular member is too low, the adjoining free rollers may engage each other or interfere with each other so that the performance of the main wheel may be seriously impaired.

BRIEF SUMMARY OF THE INVENTION

In view of such problems of the prior art, a primary object of the present invention is to provide a friction drive device that is capable of producing a high lateral fraction.

A second object of the present invention is to provide a friction drive device that can minimize frictional resistance.

A third object of the present invention is to provide a friction drive device that is economical to manufacture.

A fourth object of the present invention is to provide traction wheel that is suitable for use in the friction drive device.

According to the present invention, these and other objects can be accomplished by providing a friction drive device, comprising: a frame; a pair of drive disks rotatably supported by the frame opposite to each other in a substantially coaxial relationship; a power source for individually rotatively actuating the drive disks; a traction wheel interposed between the drive disks, the traction wheel including a plurality of articulation members pivotally connected in tandem into a loop, and a free roller rotatably supported by each articulation member so as to be rotatable around an axial line extending along the loop; with a plurality of drive rollers pivotally supported along a peripheral part of each drive disk at a substantially regular angular interval and engaging the free rollers at an oblique angle.

The articulation members thus allow the free rollers to be held in a loop without requiring a stiff annular member. In other words, the articulation members serve both as the stiff annular member and the sleeve members of the previously proposed traction wheel. Therefore, the number of component parts can be reduced, and the productivity is increased while the manufacturing cost is reduced.

According to a preferred embodiment of the present invention, each articulation member comprises a cylindrical member and the corresponding free roller is provided around the cylindrical member so as to be rotatable around the central axial line of the cylindrical member.

In particular, if opposing end faces of each adjoining pair of the articulation member are provided with abutting surfaces that define a limit of articulation angle between the adjoining articulation members, the limit of the articulation movement between the adjoining articulation members can be selected at will. Therefore, a desired number of free rollers may be caused to engage the road surface or any other drive object at any given time point. Furthermore, the adjoining free rollers can be prevented from interfering with each other so that the frictional resistance of the traction wheel can be prevented from being unduly increased.

The present invention also provides an omni-directional vehicle including the friction drive device discussed above using the traction wheel as a ground contact propulsion wheel.

BRIEF DESCRIPTION OF THE DRAWINGS

Now the present invention is described in the following with reference to the appended drawings, in which.

DETAILED DESCRIPTION OF THE PREFERRED EMBODIMENTS

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one each of such pairs may be described in the following by denoting the component with a numeral without a suffix, instead of repeating the same description with respect to the other of the pair. These numerals are also used without the suffix in the following description to denote such components collectively.

A frictional drive device and an inverted pendulum type vehicle embodying the present invention are described in the following with reference to FIGS. 1 to 5. In the following description, the various directions are defined as indicated in the appended drawings using the forward traveling direction of the vehicle as a reference.

Figure 1:
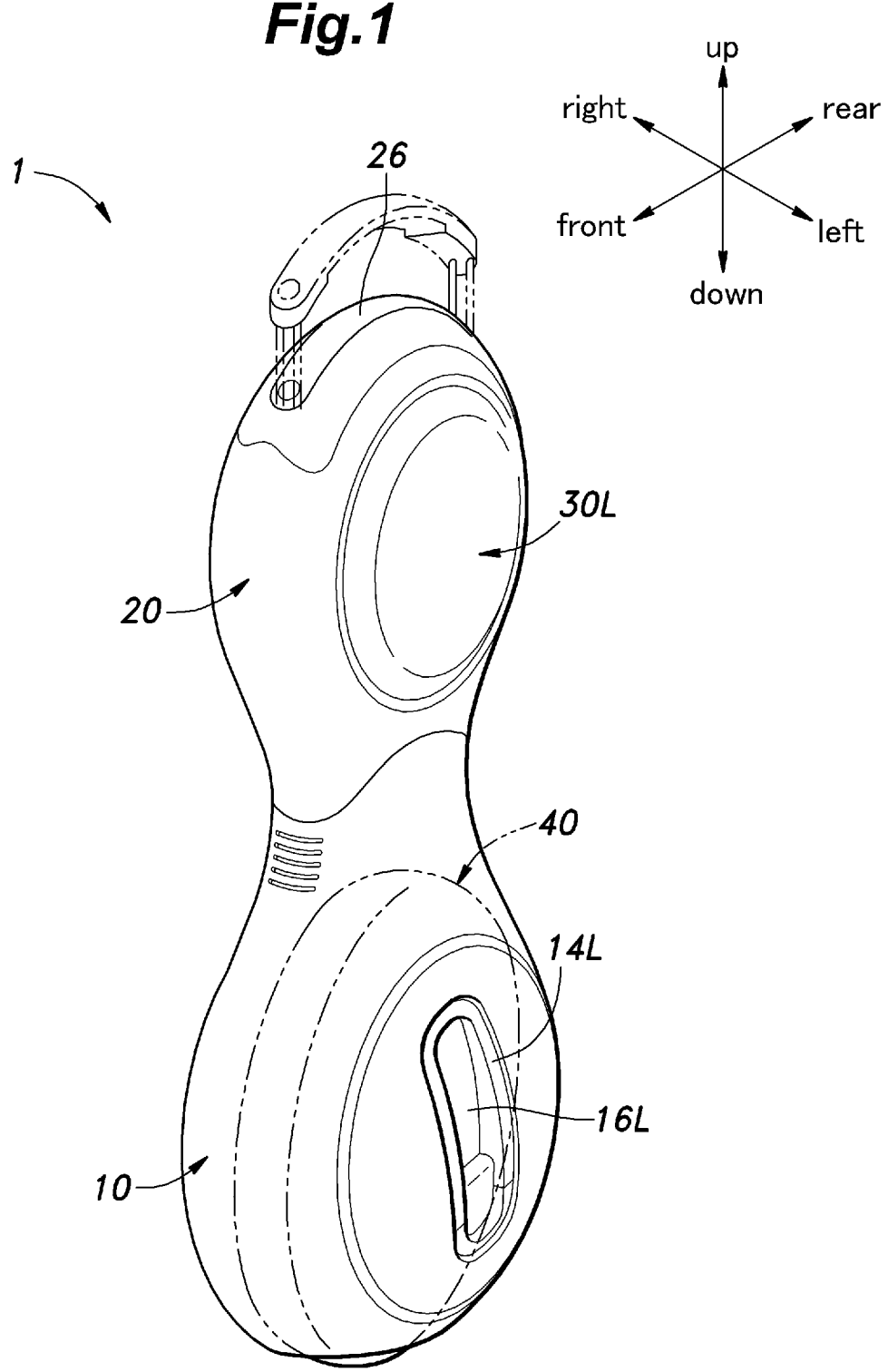
FIG. 1 is a perspective view of an omni-directional vehicle in the form of an inverted pendulum type vehicle embodying the present invention ready to be transported with a seat assembly and steps retracted.
Figure 2:
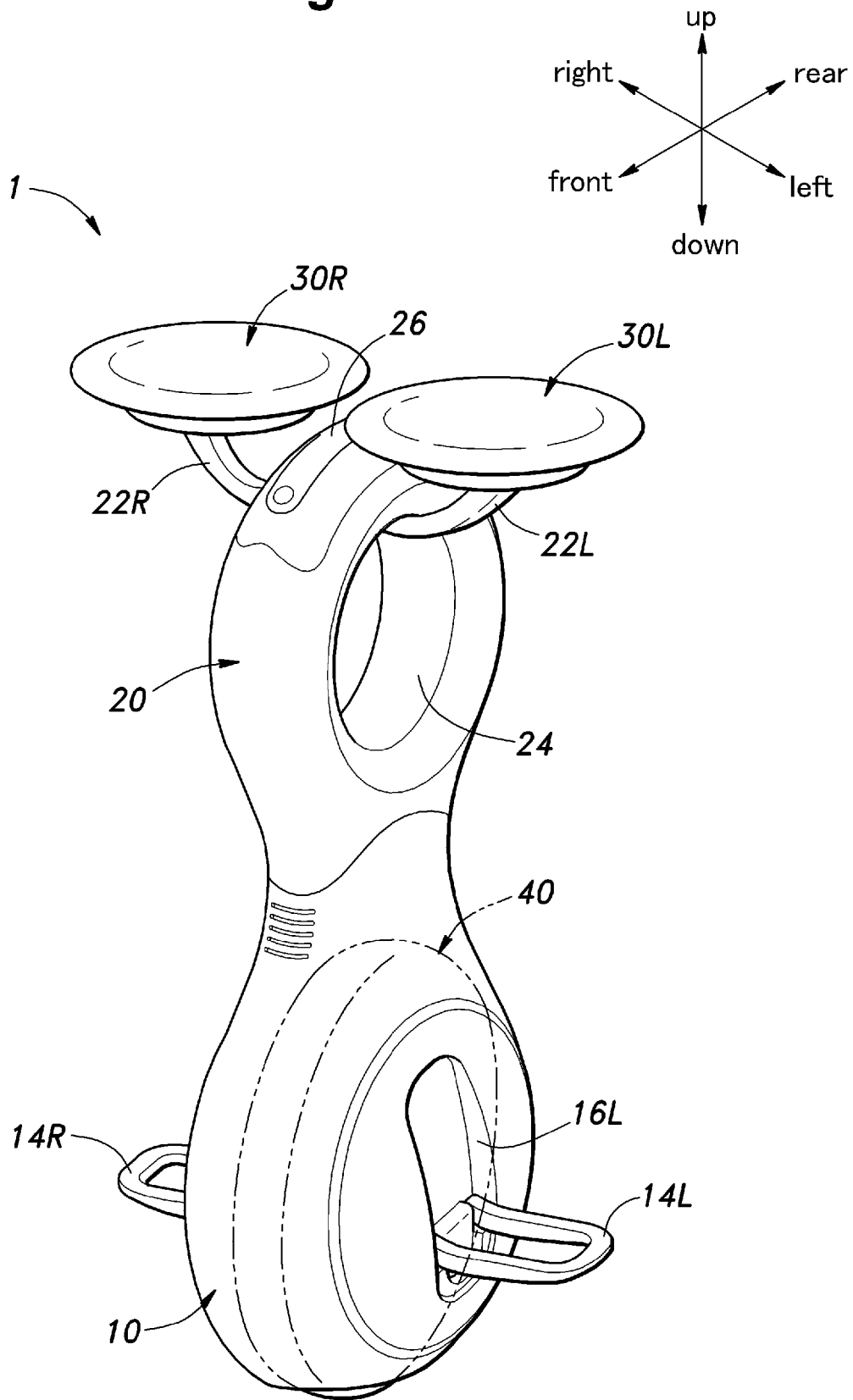
FIG. 2 is a view similar to FIG. 1 showing the vehicle ready to be operated with the seat assembly deployed for a vehicle occupant to sit thereon and steps deployed for the feet of the vehicle occupant to rest thereon.

Referring to FIGS. 1 and 2, the inverted pendulum type vehicle embodying the present invention comprises an upper frame 20 and a lower frame 10 which are connected to each other.

The lower frame 10 supports a drive unit 40 in the manner of a powered monocycle. The drive unit 40 is configured to maintain the vehicle (including the lower frame 10 and upper frame 20) in an upright posture under an inverted pendulum control using a gyro sensor and a load sensor, and allows the vehicle to travel in any two dimensional direction as will be described hereinafter.

A pair of steps 14 are provided on either side of the lower frame 10 and are each pivotally supported thereto by a pivot shaft extending in a fore and aft direction at a lower end thereof. Each step 14 is configured to be moveable between a deployed position where the step 14 extends laterally out of a step receiving recess 16 formed on the corresponding side of the lower frame 10 (as shown in FIG. 2) and a retracted position where the step 14 is tilted upward and received in the step receiving recess 16 (as shown in FIG. 1).

The upper frame 20 has an annular shape defining a central circular opening or a saddle storage space 24 extending laterally across the upper frame 20. A pair of saddle arms 22 are pivotally supported, at the base end thereof, by a support member secured to a part of the upper frame 20 defining the upper wall of the central opening, and extend laterally to either side of the upper frame 20 as shown in FIG. 2. The free end of each saddle arm 22 supports a saddle member 30. The saddle members 30 each consist of a disk shaped member extending approximately horizontally in the deployed condition thereof, and are configured to jointly support the buttocks of a vehicle occupant.

Each saddle arm 22 is curved in such a manner that the convex side thereof faces downward in the deployed state illustrated in FIG. 2. When the saddle arms 22 are pivoted downward around the base ends thereof, the saddle arms 22 are received in the saddle storage space 24 and the saddle members 30 close the saddle storage space 24 from either side as shown in FIG. 1. In the retracted state illustrated in FIG. 1, the saddle members 30, in particular the cushion surfaces thereof, define a smooth outer profile of the upper frame 20 jointly with the outer surface of the upper frame 20.

A retractable grip 26 is provided in the upper end of the upper frame 20. When the saddle members 30 are deployed, the grip 26 is received in a corresponding receive of the upper frame 20 such that the grip 26 defines a part of the smooth outer profile of the upper frame 20. When the saddle members 30 are stowed in the saddle storage space 24, the upper end of the upper frame 20 becomes accessible to the user without being hindered by the saddle members 30, and the grip 26 can be lifted out of the recess. The grip 26 then can be used for transporting the vehicle or supporting the vehicle in the upright position.

Figure 3:
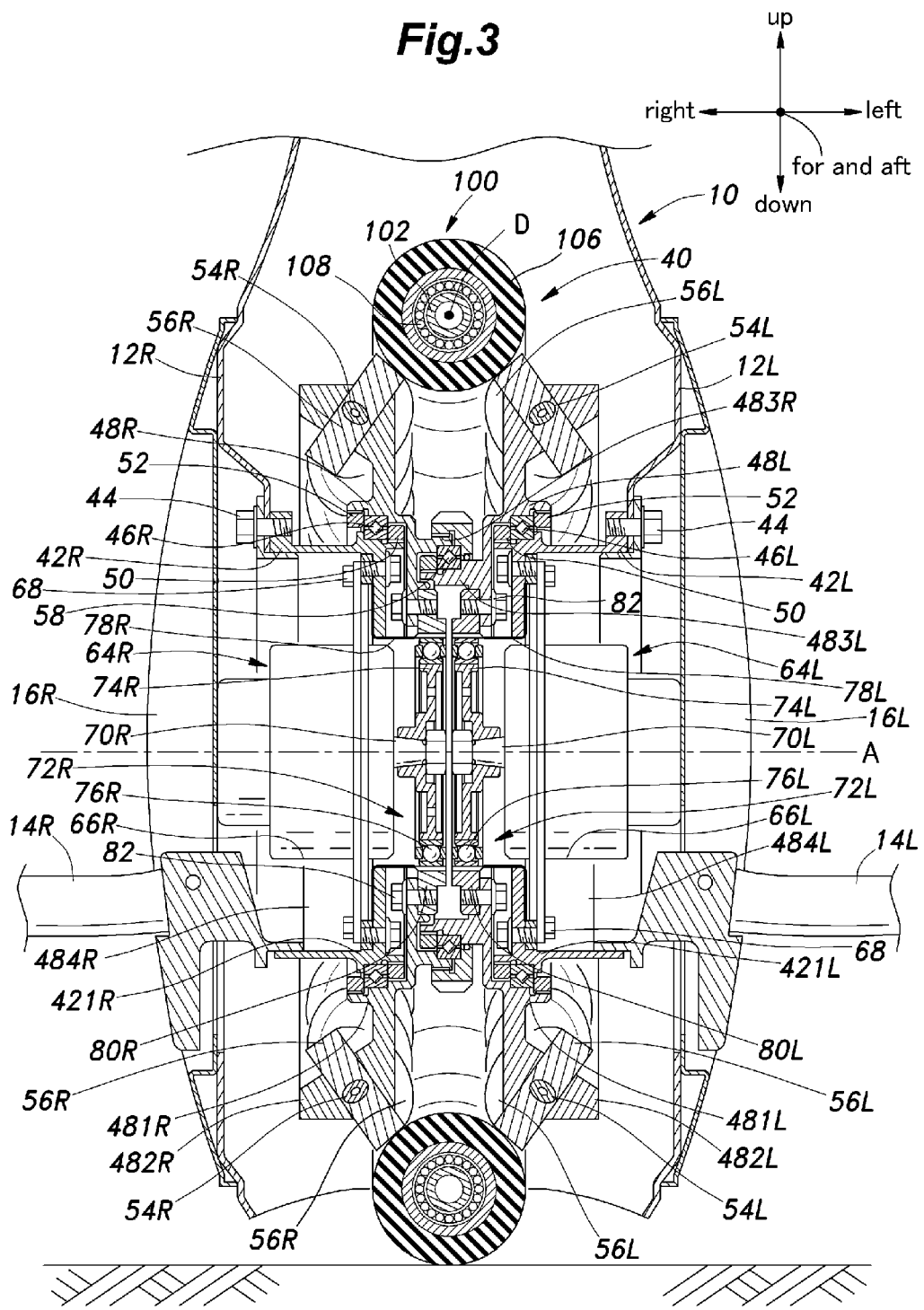
FIG. 3 is a sectional front view of a frictional drive device according to the present invention incorporated in the vehicle shown in FIGS. 1 and 2.
Figure 4:
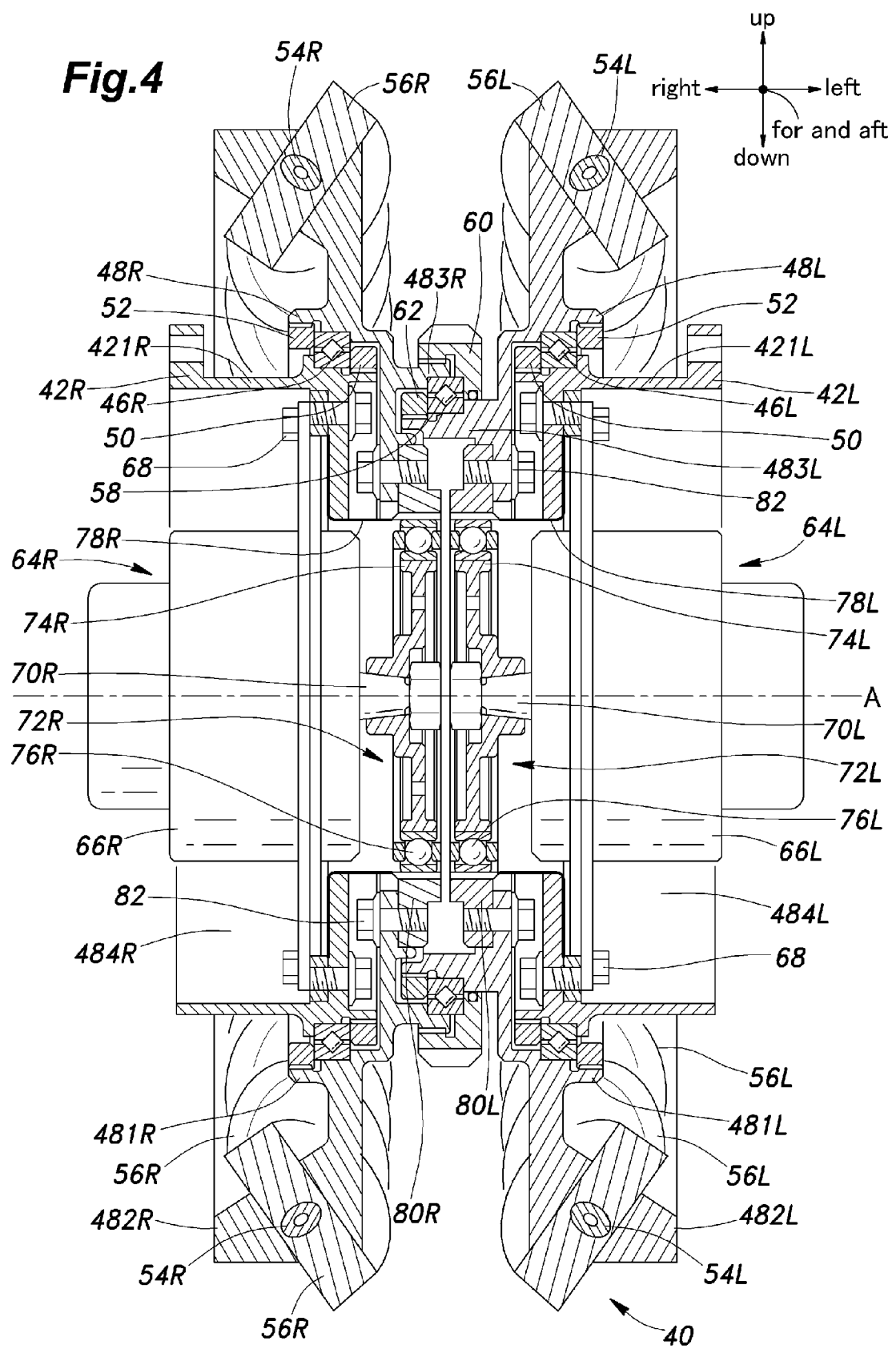
FIG. 4 is an enlarged sectional front view of the frictional drive device.

Referring to FIGS. 3 and 4, the lower frame 10 includes a pair of side walls 12 laterally spaced from each other, and a drive unit 40 is placed between the two side walls 12.

As shown in FIGS. 3 and 4, the drive unit 40 comprises a pair of symmetrically opposing drive assemblies. Each drive assembly comprises a laterally extending cylindrical mount member 42 having an outer axial end fixedly attached to the inner surface of the corresponding side wall 12 by using threaded bolts 44. The two mount members 42L and 42R are provided with a common central axial line A.

The mount member 42 is provided with a hollow, coaxial cylindrical member 421 around which an annular drive disk 48 is rotatably supported via a crossed roller bearing 46. The crossed roller bear 46 is configured to support both a radial load and an axial (thrust) load, and is kept axially immobile with respect to the mount member 42 and drive disk 48 by a fastening ring 50 threaded onto the cylindrical portion 421 of the mount member 42 and a fastening ring 52 threaded into a central cylindrical portion 481 of the drive disk 48.

Each drive disk 48 includes, in addition to the central cylindrical portion 481, a large annular portion 482 extending outwardly in the axial direction from the outer periphery of the central cylindrical portion 481. A plurality of drive rollers 56 are arranged along the periphery of the large annular portion 482 at a regular interval, and are rotatably supported thereby via respective roller shafts 54. Each drive roller 56 may be made of relatively rigid material such as metallic and plastic materials. The drive rollers 56 are arranged circumferentially along the corresponding large annular portion 482 at a regular interval, and are each rotatable around the central axial line thereof. The drive disk 48 has the function to support the drive rollers 56 at a prescribed orientation, and may have a disk, frusto-conical or any other suitable shape.

The roller shafts 54L of the left drive disk 48L are disposed symmetric to the roller shafts 54R of the right drive disks 48L, and are in a skewed relationship to the central axial line. In particular, the drive rollers 56 are rotatably supported by the respective roller shafts 54 such that the planes of rotation of the drive rollers 56 are each disposed neither in parallel to nor perpendicular to the axial center line A of the drive disk 48. The positional relationship of the drive rollers 56 on the drive disk 48 may be similar to the gear teeth of a helical bevel gear of a prescribed cone angle. For more detailed description of the basic principle of the drive unit 40, see WO2008132779A (US2010096905A1).

Each drive disk 48 is provided with a cylindrical extension 483 extending toward that of the other, the two cylindrical extensions 483L and 483R are connected to each other via a crossed roller bearing 58 in a relatively rotatable manner. The crossed ball bearing is able to support both radial and axial (thrust) loads, and is provided with an inner race fitted on the outer circumferential surface of one of the cylindrical extension 483L and an outer race fitted into the inner circumferential surface of the other cylindrical extension 483R. The inner race of the crossed roller bearing 58 is axially fixed by a fastening ring 62 threaded on the outer circumferential surface of the cylindrical extension 483L, and the outer race of the crossed roller bearing 58 is axially fixed by a fastening ring 60 threaded on the outer circumferential surface of the other cylindrical extension 483R.

The crossed roller bearing 58 forms an essential part of the connecting mechanism connecting the right and left drive disks 48R and 48L in a relatively rotatable manner, and restricts the relatively radial and axial movements between the right and left drive disks 48R and 48L by being assembled as discussed above. In other words, the crossed roller bearing 58 connects the right and left drive disks 48R and 48L so as to be rotatable relative to each other in a coaxial relationship and prevents an axial movement between them.

Thus, the coaxiality between the right and left drive disks 48R and 48L is ensured, and the axial distance between the right and left drive disks 48R and 48L is kept fixed at a prescribed value.

An electric motor 64 is coaxially disposed in a space 484 defined in the cylindrical portion 481 of each drive disk 48. Each electric motor 64 is provided with an outer housing 66 incorporated with stator coils (not shown in the drawings) and is fixedly secured to the mount member 42 by using threaded bolts 68, and a rotor shaft 70 extending inwardly or toward the other electric motor 64 in a coaxial relationship to the central axial line A.

The right and left electric motors 64R and 64L include parts that overlap with the drive rollers 56R and 56L as seen along the axial direction. In other words, in a projected plane extending in parallel with the central axial line, the right and left electric motors 64R and 64L include parts that overlap with the drive rollers 56R and 56L.

To the free end of each rotor shaft 70 is connected a wave plug 74 of a wave gear device 72 of a per se known type. The wave plug 74 serves as the input member of the wave gear device 72, and is given with a high rigidity and an elliptic profile. The wave gear device 72 includes, in addition to the wave plug 74, a wave bearing 76 fitted onto the outer circumferential surface of the wave plug 74, a flexible external teeth member 78 consisting of a flanged cylindrical thin shell frictionally engaging the outer circumferential surface of the wave bearing 76 and having external teeth formed on the outer circumferential surface thereof, and an internal teeth member 80 having internal teeth on the inner circumferential surface thereof to be meshed with the external teeth of the external teeth member 78. The internal teeth member 80 serves as an output member of the wave gear device 72, and is fixedly secured to the drive disk 48 by using threaded bolts.

The wave gear device 72 transmits the rotational output of each electric motor 64 to the corresponding drive disk 48 at a high reduction ratio.

The wave plug 74, wave bearing 76 and internal teeth member 80 are received in the internal space of the cylindrical extension 483 extending coaxially inwardly from the drive disk 48. The electric motor 64 is received in the internal space of the central cylindrical portion 481 of the drive disk 48. These features contribute to the minimization of the axial dimension of the drive unit 40.

The right and left drive disks 48R and 48L interpose a traction wheel 100 via drive rollers 56 from two lateral sides such that the traction wheel 100 is supported coaxially or substantially coaxially with the central axial line A. In other words, the fraction wheel 100 is rotatably supported without having any central shaft by two sets of drive rollers 56, each set consisting of drive rollers 56 arranged in an annular fashion, so as to be rotatable around the central axial line A or approximately around the central axial line A.

Figure 5:
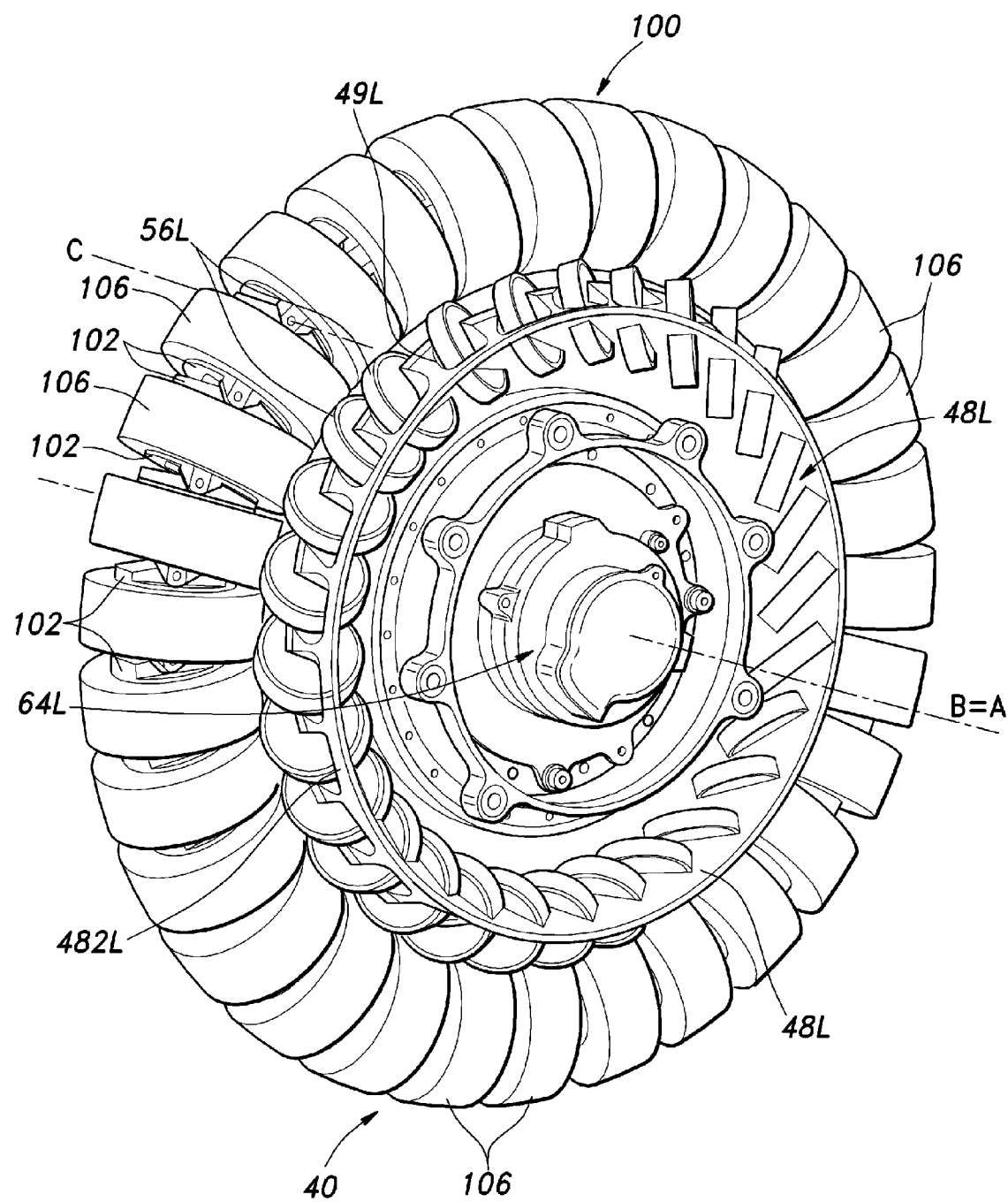
FIG. 5 is a perspective view of the frictional drive device.

The details of the traction wheel 100 of the illustrated embodiment are described in the following with reference to FIG. 3 and FIGS. 5-9. The traction wheel 100 comprises a plurality of articulation members 102 that are arranged substantially concentric around a wheel center line B in an annular or in a polygonal shape as shown in FIG. 5. Each articulation member 102 is connected in tandem to each of the adjacent articulation members 102 via a pivot pin 104 having a pivot axial line C in parallel with the wheel center line B.

Each articulation member 102 is made of hard metallic or plastic material, and includes a cylindrical portion 102A, a large diameter portion 102C formed on an axial end of the cylindrical portion 102A, a pair of axial projections 102D projecting from diametrically opposing positions on the outer peripheral part of the axial end of the large diameter portion 102C, and a pair of flat surfaces 102F formed on the lateral part of the other axial end portion 102E so as to correspond to the axial projections 102D and extending in parallel to each other. The other axial end portion 102E is provided with an outer periphery substantially defining an axial extension of the outer circumferential surface of the cylindrical portion 102A except for the flat surfaces 102F which are recessed from the outer circumferential surface of the cylindrical portion 102A by an equal depth. The outer circumferential surface of the axial projections 102D is also formed as a substantially continuous extension of the outer circumferential surface of the cylindrical portion 102A.

The flat surfaces 102F and the axial projections 102D are formed with radial through holes 102H and 102G. The flat surfaces 102F and the axial projections 102D are configured and dimensioned such that when two of the articulation members 102 are brought toward each other coaxially along the axial direction in tandem, the flat surfaces 102F are closely received in the space defined between the axial projections 102D and the through holes 102H and 102G align with each other. A pivot shaft 104 which may be made of resilient hollow tube is passed through the through holes 102H and 102G. A number of articulation members 102 are joined in this fashion until a loop or a full circle of the articulation members 102 is formed. Thereby, the articulation members 102 are thus joined into an annular or polygonal shape of a prescribed diameter.

The pivot shaft 104 preferably consists of a detachable type using resiliency or threaded engagement, and may be selected from any per se known pivot pin structure. The pivot shaft 104 thus defines a pivot axis for the articulation movement of the adjoining two articulation members 102.

The axial end of the other axial end portion 102E is shaped like a roof by a pair of slanted end surfaces 102J and 102K which serve as stopper surfaces by abutting the end surface 102L of the large diameter portion 102C so as to define the limit of the articulation movement of the adjoining two articulation members 102. In the illustrated embodiment, one of the slanted end surfaces 102K has a greater slanting angle with respect to the axial line than the other slanted end surface 102J so that the articulation member 102 is able to tilt inward by a greater angle than outward.

Figure 6:
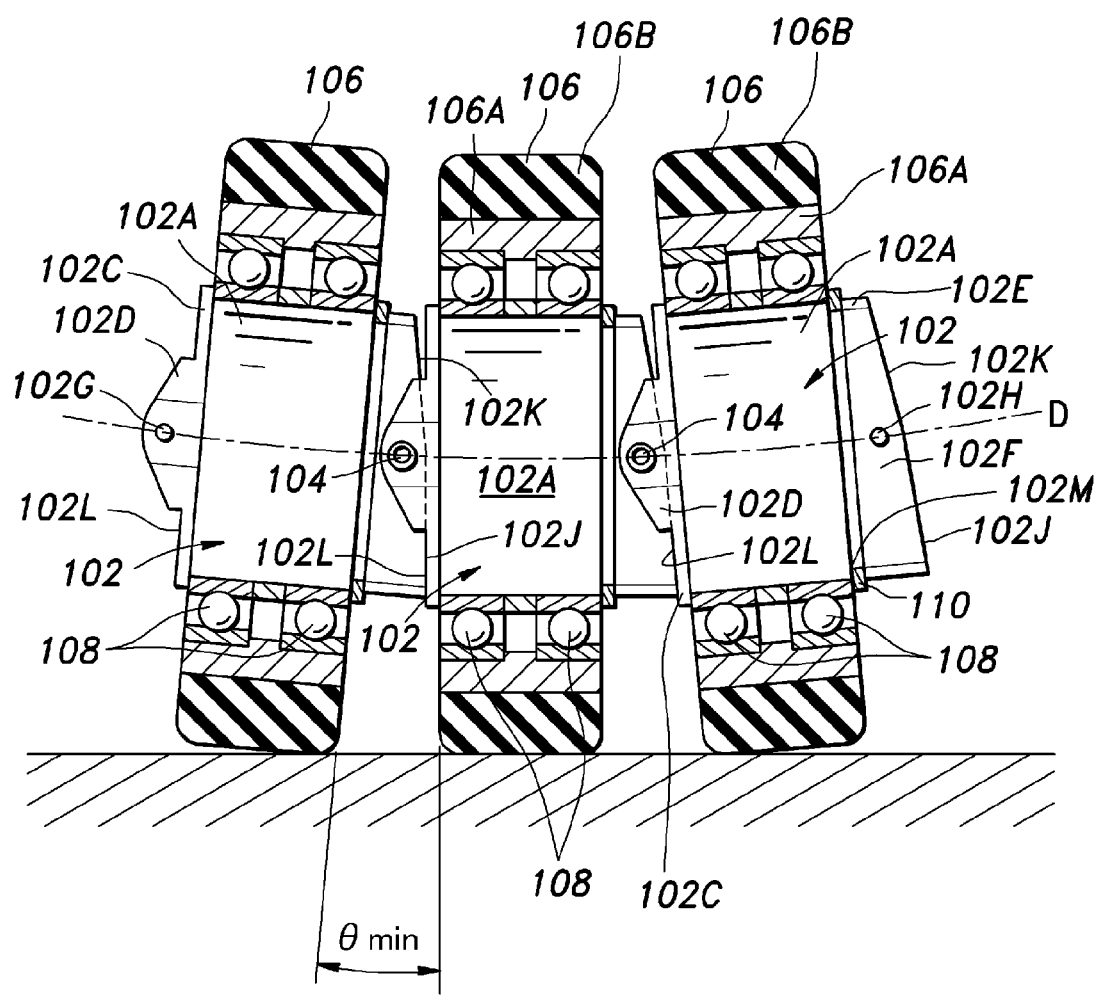
FIG. 6 is a fragmentary sectional view of a lower part of the traction wheel at a minimum articulation angle.
Figure 7:
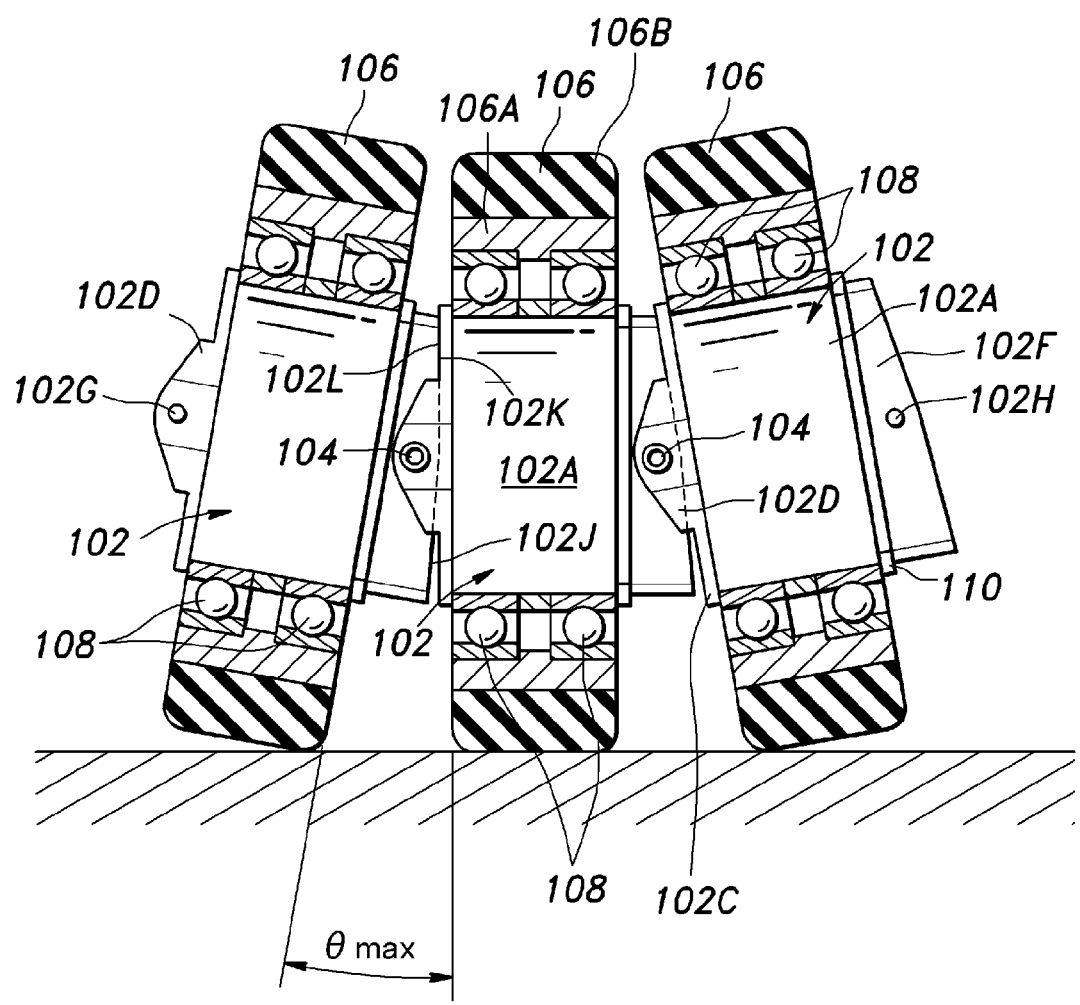
FIG. 7 is a view similar to FIG. 6 at a maximum articulation angle.
Figure 8:
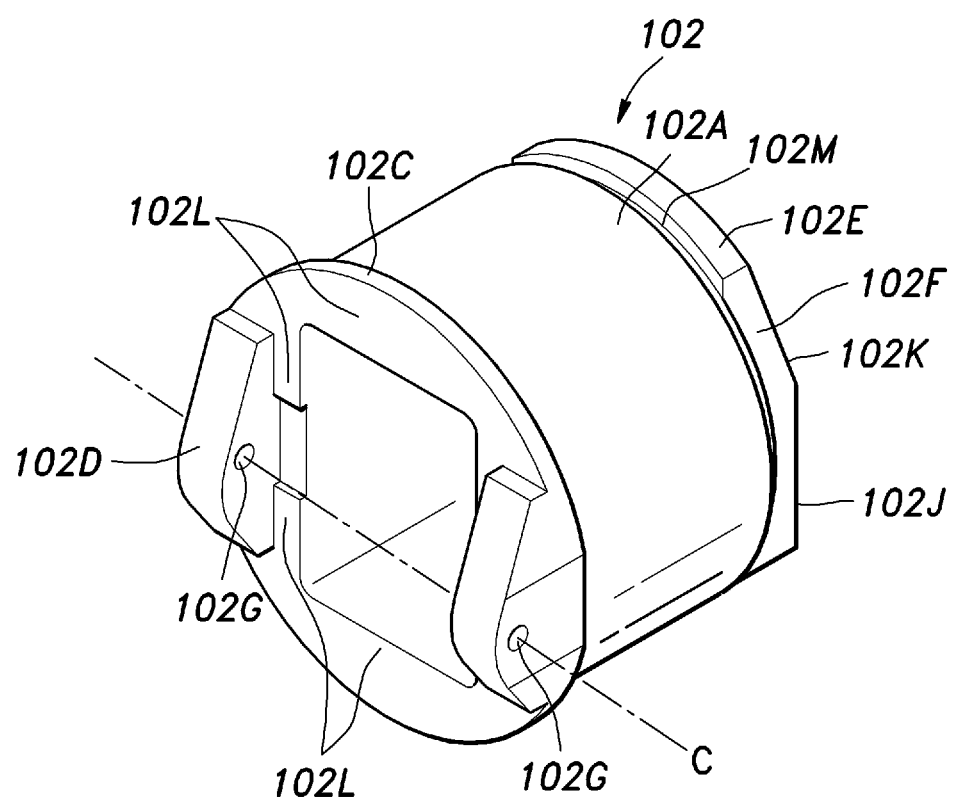
FIG. 8 is an enlarged perspective view of one of the articulation members as seen from one direction.
Figure 9:
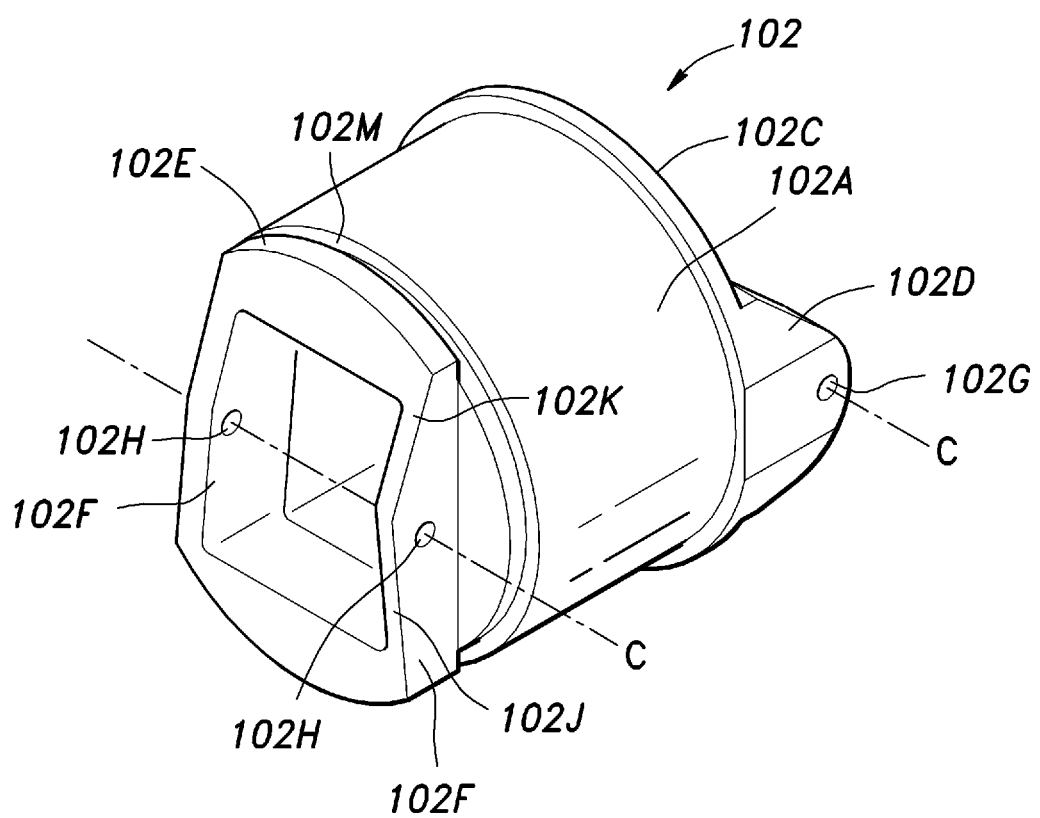
FIG. 9 is an enlarged perspective view of the articulation member as seen from an opposite direction.

As shown in FIG. 6, the minimum opening angle θmin between the adjoining articulation members 102 can be achieved by engaging the less slanted end surface 102J with the end surface 102L. As shown in FIG. 7, the maximum opening angle θmax between the adjoining articulation members 102 can be achieved by engaging the more slanted end surface 102K with the end surface 102L. Thus, each adjoining pair of articulation members 102 can flex relative to each other by any angle ranging between the maximum and minimum opening angles θmax and θmin.

A free roller 106 is provided around each articulation member 102. The free roller 106 includes a metallic sleeve 106A which is rotatably supported around the cylindrical portion 102A of the articulation member 102 via a pair of ball bearings 108 arranged in an axially spaced apart relationship and a rubber liner 106B vulcanized on the outer circumferential surface of the metallic sleeve 106A. This free roller 106 has a substantially same axial length as the cylindrical portion 102A of the articulation member 102. The inner races of the ball bearings 108 are axially spaced apart by a ring member, and are jointly held against axial movement by a C-ring 110 fitted into a circumferential groove 102M formed around the other axial end portion 102E. The inner circumferential surface of the sleeve member 102 is provided with a circumferential ridge in an axially middle part thereof to maintain the axial spacing between the outer races of the ball bearings 108.

The articulation member 102 thus supports the free roller 106 around the central axial line of the sleeve member 102A thereof via the ball bearings 108. In other words, the free rollers 106 are individually rotatable around a circular cross sectional center line D (or a tangential line thereof) which is given by an aggregation of the axial center lines of the articulation members 102.

The articulation members 102 thus collectively serve as an annular member rotatably supporting the free rollers 106 like beads of a rosary. As opposed to the main wheel of the inverted pendulum type vehicle disclosed in WO2008132779A (US2010096905A1) which uses a stiff annular member for supporting the free rollers of the main wheel, the traction wheel 100 of the present invention can be fabricated both easily and at a lower cost. In particular, according to the present invention, because there is no need to support each roller on an arcuate annular member, the component parts of each free roller can be simplified, and the fabrication process can be simplified.

In the illustrated embodiment, the minimum opening angle θmin is selected as an angle that causes the adjoining free rollers 106 to engage the ground surface (or an object to be actuated) without quite becoming parallel to each other, but allows a plurality of free rollers 106 to engage the ground surface at the same time as shown in FIG. 6. The maximum opening angle θmax is selected as an angle that prevents interferences between the adjoining free rollers 106 as shown in FIG. 7 (in particular at upper part in FIG. 7). Also, the maximum opening angle θmax may be selected as an angle that allows a desired number (three, for instance) of the free rollers 106 to engage the road surface at any given moment.

As shown in FIGS. 3 and 5, as the drive rollers 56L and 56R engage the outer peripheral surfaces of the rubber roller portions 106B of the free rollers 106 defining the outer peripheral part of the traction wheel 100 from two lateral sides, not only the fraction wheel 100 is maintained in a substantially annular shape with the central axial line B of the fraction wheel 100 disposed substantially coaxially with the central axial line A of the drive disks 48 but also the drive force of the drive disks 48 is frictionally transmitted to the free rollers 106 via the drive rollers 56.

The roller shafts 54L of the left drive disk 48L are disposed symmetric to the roller shafts 54R of the right drive disks 48R, and are in a skewed relationship to the corresponding central axial line A. In particular, the drive rollers 56 are rotatably supported by the respective roller shafts 54 such that the planes of rotation of the drive rollers 56 are each disposed neither in parallel to nor perpendicular to the axial center line (center of rotation) A of the drive disk 48. The positional relationship of the drive rollers 56 on the drive disk 48 may be similar to the gear teeth of a helical bevel gear of a prescribed cone angle. For more detailed description of the basic principle of the drive unit 40, see WO2008132779A (US2010096905A1).

In the illustrated embodiment, the mode of rotation of the traction wheel 100 and rotation of the free rollers 106 is determined by the mode of rotation of the two drive disks 48L and 48R. When the two drive disks 48L and 48R are rotated at a same speed in a same direction, the traction wheel 100 rotates circumferentially or around the central axial line A while the free rollers 106 do not rotate around the respective axial lines so that the vehicle travels either in the forward or rearward direction depending on the rotational direction of the drive disks 48L and 48R.

When the two drive disks 48L and 48R are rotated at a same speed in opposite directions, the traction wheel 100 remains stationary while the free rollers 106 rotate around the respective axial lines so that the vehicle travels sideways depending on the rotational directions of the drive disks 48L and 48R.

When the two drive disks 48L and 48R are rotated at mutually different speeds, the traction wheel 100 is rotated around the central axial line A at a speed corresponding to the average of the rotational speeds of the two drive disks 48L and 48R, and the drive rollers 92 are rotated around their respective axial lines at a speed corresponding to the difference between the rotational speeds of the two drive disks 48L and 48R.

Therefore, by controlling the electric motors 64L and 64R and thereby appropriately selecting the rotational speeds of the two drive disks 48L and 48R, the vehicle is allowed to travel in any desired direction given as a composition of a fore-and-aft movement and a lateral movement.

As the upward bending angle between the adjoining articulation members 102 at the ground contact area is prevented from exceeding the minimum angle θmin owing to the abutment between the slanted surface 102J and the opposing end surface 102L as shown in FIG. 6, the free rollers 106 engaging the road surface at the same time are prevented from lining up or being arranged in parallel with the ground surface. In particular, the minimum angle θmin in the illustrated embodiment is selected such that three of the free rollers 106 engage the road surface simultaneously without these free rollers 106 being arranged in parallel with the road surface. In other words, the three free rollers 106 that engage the road surface at the same time are arranged along an arcuate line. Thereby, the lateral movement of the traction wheel 100 through the rotation of the free rollers 106 engaging the road surface can be achieved in a stable manner with an adequate traction force.

Furthermore, because the bending angle between the adjoining articulation members 102 does not exceed the maximum angle θmax owing to the abutment between the slanted surface 102K and the opposing end surface 102L as shown in FIG. 6, the adjoining free rollers 106 are prevented from interfering with each other.

Although the present invention has been described in terms of a preferred embodiment thereof, it is obvious to a person skilled in the art that various alterations and modifications are possible without departing from the scope of the present invention which is set forth in the appended claims. For instance, the wave gear device 72 of the illustrated embodiment may be replaced by a planetary gear device or any other speed reduction device which is compact and capable of achieving a high gear ratio.

The contents of the original Japanese patent application on which the Paris Convention priority claim is made for the present application as well as the contents of any prior art references mentioned in this application are incorporated in this application by reference.

The invention claimed is:

1. A friction drive device, comprising:
 a frame;
 a pair of drive disks rotatably supported by the frame opposite to each other in a substantially coaxial relationship;
 a power source mounted on the frame for individually rotatively actuating the drive disks;
 a traction wheel interposed between the drive disks, the traction wheel including a plurality of articulation members pivotally connected in tandem into a loop and a free roller rotatably supported by each articulation member so as to be rotatable around an axial line extending along the loop, the articulation members being pivotally movable around pivot axial lines extending in parallel with a center line of the drive disks;
 and a plurality of drive rollers pivotally supported along a peripheral part of each drive disk at a substantially regular angular interval and in a skewed relationship to the center line of the drive disks, and engaging the free rollers over an entire circumference of the traction wheel;
 wherein opposing end faces of each adjoining pair of the articulation members are provided with abutting surfaces that define an opening angle between each adjacent pair of free rollers, said opening angle greater than a minimum angle that causes the adjoining free rollers to engage a ground surface without becoming parallel to each other, but allows a plurality of the free rollers to engage the ground surface at the same time.

2. The friction drive device according to claim 1, wherein each articulation member comprises a cylindrical member and the corresponding free roller is provided around the cylindrical member so as to be rotatable around the central axial line of the cylindrical member.

3. The friction drive device according to claim 1, wherein opposing end faces of each adjoining pair of the articulation members are provided with abutting surfaces that define a limit of articulation angle between the adjoining articulation members.

4. An omni-directional vehicle including the friction drive device according to claim 1 using the traction wheel as a ground contact propulsion wheel.

5. The friction drive device according to claim 1, wherein each articulation member comprises a cylindrical member, and wherein an axial end of each articulation member is provided with a pair of flat surfaces on lateral parts thereof, and an opposing axial end of an adjoining articulation member is provided with a pair of axial projections diametrically opposing each other and defining a space therebetween for closely receiving the flat surfaces, a pivot shaft being passed through the axial projections and the flat surfaces.

6. A traction wheel, comprising:
 a plurality of articulation members each comprising a cylindrical member, the articulation members being pivotally connected in tandem into a loop;
 and a free roller rotatably supported by and surrounding each articulation member so as to be rotatable around an axial line extending along the loop;
 wherein an axial end of each articulation member is provided with a pair of flat surfaces on lateral parts thereof, and an opposing axial end of an adjoining articulation member is provided with a pair of axial projections diametrically opposing each other and defining a space therebetween for closely receiving the flat surfaces;
 wherein a pivot shaft is passed through the axial projections and the flat surfaces.

7. The traction wheel according to claim 6, wherein each articulation member comprises a cylindrical member and the corresponding free roller is provided around the cylindrical member so as to be rotatable around the central axial line of the cylindrical member.

8. The traction wheel according to claim 6, wherein opposing end faces of each adjoining pair of the articulation members are provided with abutting surfaces that define a limit of articulation angle between the adjoining articulation members.

9. The traction wheel according to claim 6, wherein an opening angle defined between each adjacent pair of free rollers is greater than a minimum angle that causes the adjoining free rollers to engage a ground surface without becoming parallel to each other, but allows a plurality of the free rollers to engage the ground surface at the same time.

10. A traction wheel, comprising:
 a plurality of articulation members pivotally connected in tandem into a loop; and
 a free roller rotatably supported by each articulation member so as to be rotatable around an axial line extending along the loop;
 wherein opposing end faces of each adjoining pair of the articulation members are provided with abutting surfaces that define an opening angle between each adjacent pair of free rollers, said opening angle greater than a minimum angle that causes the adjoining free rollers to engage a ground surface without becoming parallel to each other, but allows a plurality of free rollers to engage the ground surface at the same time.

11. The traction wheel according to claim 10, wherein each articulation member comprises a cylindrical member and the corresponding free roller is provided around the cylindrical member so as to be rotatable around the central axial line of the cylindrical member.

12. The traction wheel according to claim 10, wherein an axial end of each articulation member is provided with a pair of flat surfaces on lateral parts thereof, and an opposing axial end of an adjoining articulation member is provided with abutting surfaces that define the minimum opening angle and maximum opening angle between the adjoining free rollers.

13. The traction wheel according to claim 10, wherein an axial end of each articulation member is provided with a pair of flat surfaces on lateral parts thereof, and an opposing axial end of an adjoining articulation member is provided with a pair of axial projections diametrically opposing each other and defining a space therebetween for closely receiving the flat surfaces, a pivot shaft being passed through the axial projections and the flat surfaces.

* * * * *